(12) United States Patent
Diaz de Cerio Garcia de Mendaza et al.

(10) Patent No.: US 8,864,464 B2
(45) Date of Patent: Oct. 21, 2014

(54) WIND TURBINE MECHANICAL BRAKE

(75) Inventors: Cesar Diaz de Cerio Garcia de Mendaza, Sarriguren (ES); Angel Fernandez Garcia, Sarriguren (ES)

(73) Assignee: Gamesa Innovation & Technology, S.L., Sarriguren (Navarra) (ES)

( * ) Notice: Subject to any disclaimer, the term of this patent is extended or adjusted under 35 U.S.C. 154(b) by 143 days.

(21) Appl. No.: 13/577,058

(22) PCT Filed: Jan. 26, 2011

(86) PCT No.: PCT/ES2011/000017
§ 371 (c)(1),
(2), (4) Date: Oct. 19, 2012

(87) PCT Pub. No.: WO2011/095655
PCT Pub. Date: Aug. 11, 2011

(65) Prior Publication Data
US 2013/0056314 A1    Mar. 7, 2013

(30) Foreign Application Priority Data
Feb. 4, 2010   (ES) .................................. 201000131

(51) Int. Cl.
*F16D 55/36* (2006.01)
*F16D 55/02* (2006.01)
*F03D 7/02* (2006.01)

(52) U.S. Cl.
CPC .............. *F03D 7/0248* (2013.01); *F16D 55/02* (2013.01); *F05B 2260/902* (2013.01); *Y02E 10/723* (2013.01); *F05B 2270/107* (2013.01)
USPC ............................................. 416/1; 188/71.1

(58) Field of Classification Search
USPC ............... 416/1, 9; 188/71.1, 71.5, 73.1, 73.2
See application file for complete search history.

(56) References Cited

U.S. PATENT DOCUMENTS

| | | | |
|---|---|---|---|
| 6,609,889 B1 * | 8/2003 | Vilsboll ............................ | 416/1 |
| 2011/0033291 A1 * | 2/2011 | Moore et al. ..................... | 416/1 |
| 2011/0142626 A1 * | 6/2011 | Hanson et al. ................... | 416/9 |

FOREIGN PATENT DOCUMENTS

| | | |
|---|---|---|
| DE | 3516821 A1 | 11/1986 |
| DE | 20212459 U1 | 12/2003 |
| DE | 102007058746 A1 | 12/2008 |
| DE | 102007040834 A1 | 3/2009 |
| ES | 2276293 T3 | 6/2007 |

* cited by examiner

*Primary Examiner* — Christopher Schwartz
(74) *Attorney, Agent, or Firm* — Ladas & Parry LLP

(57) ABSTRACT

The mechanical brake comprises a double disc (D1 and D2) rotating with the transmission shaft and some brake calipers (P1 and P2) that apply friction on the disc when activated electrically, hydraulically or pneumatically. The brake is characterized because its high-speed shaft (Ea) is equipped with a drive train, adapting its diameter to some dimensions marked by the existing space and anchoring the brake calipers directly to the cover of the gearbox (M).

The mechanical brake thus constituted is capable of braking with the pitch actuator in power position, in initial conditions of nominal power and at nominal average wind speed for an installation below 1 MW.

6 Claims, 2 Drawing Sheets

WIND TURBINE MECHANICAL BRAKE

OBJECT OF THE INVENTION

The object of the invention is to provide a wind turbine, within a power range of approximately 1 MW, with a mechanical brake that will maintain the yaw shaft blocked during wind turbine start-up and maintenance operations and likewise comply with the emergency brake requirements for braking derived from a fault in the pitch mechanism.

BACKGROUND OF THE INVENTION

The mechanical transmission system, or drive train, of a wind turbine comprises a wind rotor, a gearbox (since the turbine's rotation speed does not usually match the generator's speed) and an electric generator. The drive train includes a low-speed shaft mounted between the wind rotor and the gearbox, and a high-speed shaft mounted between the gearbox and the generator. In addition, the drive train includes a mechanical brake, which function is blocking the turbine for maintenance operations and which usually contributes in case of emergency stops such as the one that could occur facing a pitch mechanism fault obstructing blade feathering. Stopping a wind turbine is one of the most critical operations because it implies the generation of elevated stress levels that directly affect components of the wind turbine.

The physical constitution of the mechanical brake comprises a disc that rotates with the transmission shaft and some brake calipers that apply friction on the disc when activated electrically, hydraulically or pneumatically.

One of the most relevant aspects in the design of the mechanical brake is its placement on the drive train, since it could either be installed on the low-speed shaft or on the high-speed shaft.

For reduced power turbines (approximately 1 MW or less power) the most suitable location for the mechanical brake is on the low-speed shaft, the location reflected in patents JP2004124771 (A) and NL8302191 (A). In any event, there are instances of mechanical brakes consisting of a single disc and installed on the high-speed shaft. The mechanical brakes formed by a single disc present the following problems: The amount of energy to dissipate is the kinetic energy of the rotor unit plus the mechanical work developed by the aerodynamic torque during braking (which is not insignificant when the blades are in the power position, since, if the pitch mechanism has failed, these cannot feather out). This amount of energy defines the volume of the brake disc, thus defining both the thickness and diameter of the disc.

The critical braking of maximum energy lasts for a certain duration, since the torque must be at a certain definite value to stop the machine. This energy converts to heat in the disc and raises its temperature. In order to maintain temperatures within acceptable limits (above which the system would overheat and fail), the disc volume must be a certain value, hence its thickness and diameter could be increased. Having an elevated disc thickness would not help much since the heat would generate on its surface. The time elapsed during braking is insufficient for heat transfer from the surface to the mid-plane of the disc. Thus, there is a disc temperature gradient that decreases towards the inside or mid-plane. There is therefore a practical limit on the disc thickness, beyond which there is no benefit of a significant reduction in the surface temperature when augmenting the thickness. Consequently, only the diameter of the disc remains as the ultimate variable to increase the volume of the ferrous material and achieve reasonable surface temperatures on the disc/pad. With a single disc, the diameter of the brake for a wind turbine with an approximately 1 MW power rating would, as such, interfere with the adjacent elements at this position in the nacelle (namely the gear motors of the yaw) and the wear and maintenance on this element would prove to be excessively costly.

With the purpose to gain in ferrous material mass where store dissipated energy on braking during pitch mechanism fault preventing blade feathering, a mechanical brake has been conceived with at least two brake discs.

DESCRIPTION

When the mechanical brake is designed solely to block the rotor, the torque generated at the drive train that must support is the one transmitted by the wind rotor at feathered position in conditions of extreme wind. Nevertheless, in addition to the blocking function, the mechanical brake can be used for dynamic braking of the wind rotor during emergency stop processes (with the blades in the power position).

An object of the invention is to improve the existing mechanical brake in machines of approximately 1 MW so as to have them block the rotor according to the design requirements and incorporate the braking operation in emergency stop processes.

Another object of the invention is to conceive a mechanical brake made of at least two brake discs that assure the necessary ferrous material volume to achieve reasonable temperatures at the surface and pad of the disc.

Another object of the invention is to install the mechanical brake comprising at least two discs on the high-speed shaft of a drive train, adapting it to the dimensions permitted by the existing space and anchoring the brake calipers directly to the gearbox cover.

These and other objects of the invention are achieved with a mechanical brake having at least two discs, which is explained in detail in the preferential embodiment according to the attached drawings.

DESCRIPTION OF THE PREFERENTIAL EMBODIMENT

Figure 1:
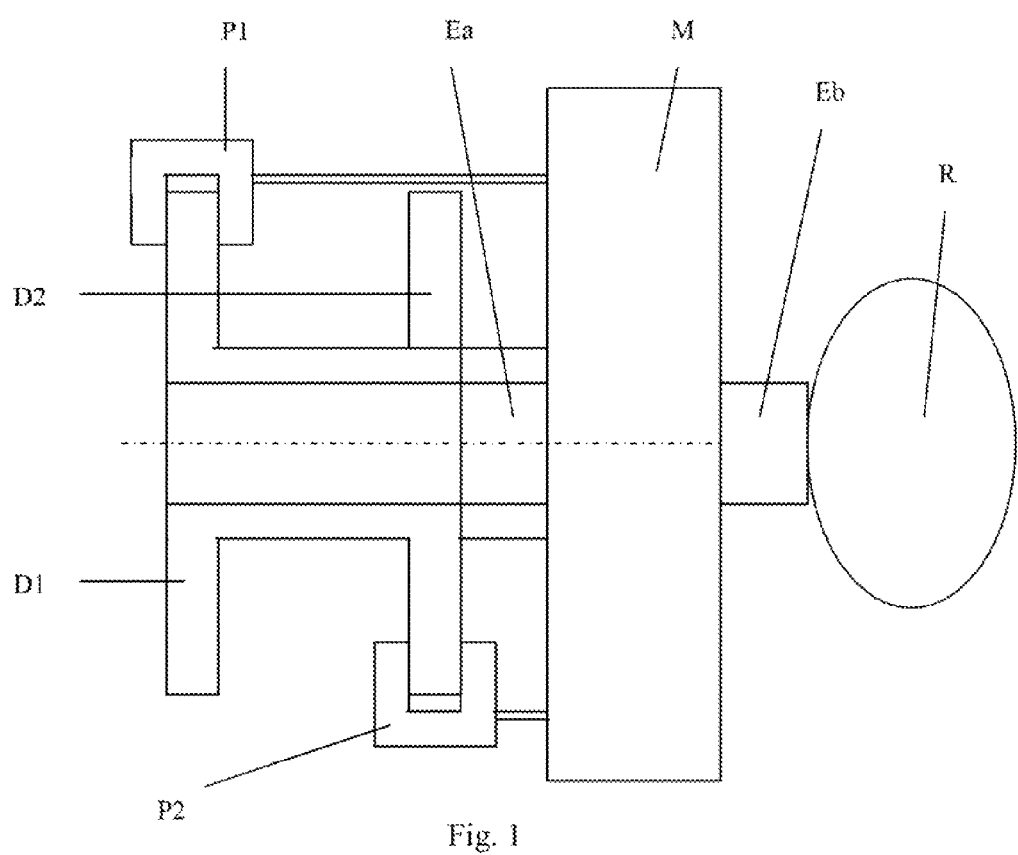
FIG. 1 shows a general representation of certain elements of a wind turbine, including a double disc within the transmission shaft.

As shown in FIG. 1, the wind turbine comprises a wind rotor (R), a gearbox (M) and an electric generator (not shown in the figure). This unit of elements constitutes the drive train and includes a low-speed shaft (Eb) connecting the wind rotor (R) and the gearbox (M), and a high-speed shaft (Ea) connecting the gearbox (M) to the generator. A gearbox (M) is utilized because the rotation speed of the rotor (R) normally does not match the speed of the generator and, taking the opportunity of the multiplication ratio, the mechanical brake, which function is blocking the turbine in maintenance operations and emergency stops, is mounted on the high-speed shaft (Ea). In positioning the brake at this location, the torque necessary to brake is much lower as speed is reduced by the multiplication ratio of the gearbox.

The mechanical brake, object of this invention, comprises two discs (D1 and D2) parallel and separated at a distance sufficient to allow the activation of the calipers (P1 and P2) equipped with brake pads, situated diametrically opposed, and each one applying its braking force on its corresponding disc.

Figure 2:
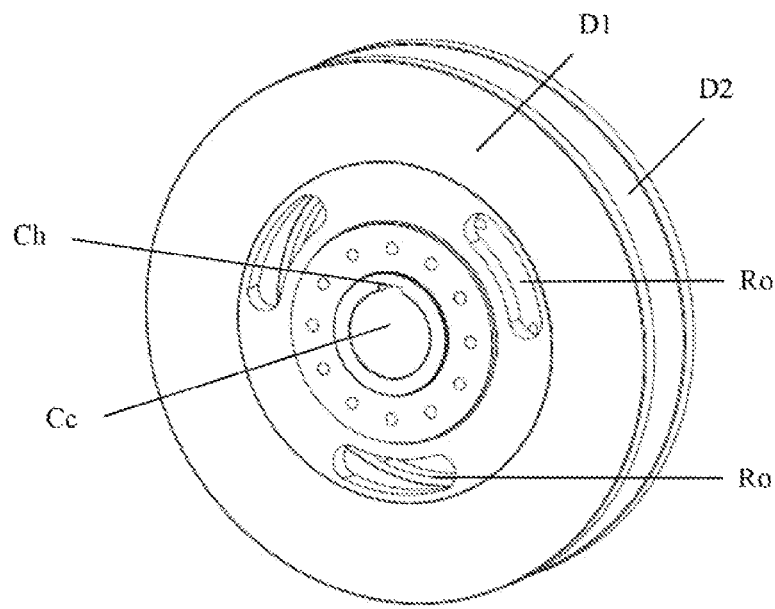
FIG. 2 represents a perspective view and a section of the double disc.

FIG. 2 shows these two discs (D1 and D2) and a sectioned view of them. In the central part of the discs, there are oval grooves (Ro) crossing the two-disc unit that allow the insertion of belts, anchors or hooks for handling and positioning them on the high-speed shaft (Ea). The center circle (Cc) has a key (Ch) which locks the discs unit to the movement of the shaft.

Figure 3:
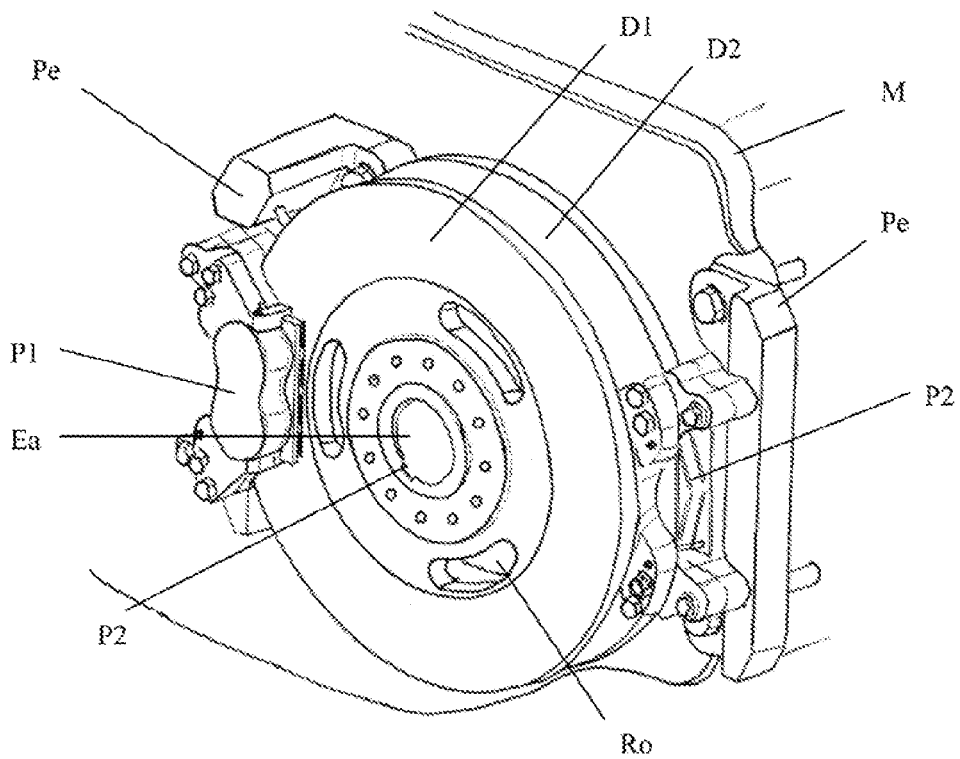
FIG. 3 is a perspective view of the unit assembled on the gearbox.

As represented in FIG. 3, the mechanical brake is positioned next to the gearbox (M) and each one of the calipers (P1 and P2) is supported on a lengthened and stepped piece (Pe), which is anchored directly to the chassis of the gearbox (M) by at least one threaded rod. The discs (D1 and D2) have a continuous braking surface (no orifices, grooves or slots), since no rapid, dissipation of heat accumulated during braking is necessary.

Bearing in mind that administrative regulations in numerous jurisdictions require wind turbines to be equipped with at least a mechanical brake capable of braking with the pitch actuator in the power position. In other words: without feathering, in the initial conditions of nominal power and at nominal average wind speed for the installation. This type of braking is required to obtain the certification of the machine. Thus, the brake disc necessary to perform this certification, being a double disc, could have a reduced diameter permitting its suitability for the existing space between the gearbox (M) and the generator.

The following table compares the disc types and the temperature reached in relation to their respective diameters and thicknesses.

| Disc type | Temperature | Diameter | Thickness |
|---|---|---|---|
| Simple disc | 650° C. | 600 mm | 25 mm |
| Double disc | 260° C. | 610 mm | 25 mm |

The data appearing on the table above are considered as a practical example of the application of this invention on a wind turbine with a rotor (R) diameter of 50 to 60 meters, with a single brake disc having a thickness of approximately 25 mm and a diameter of 600 mm. In this case it should be considered, that the theoretical increase in temperature when braking the rotor, with the pitch mechanism blocked and the machine under nominal conditions of power and wind speed, is approximately 600° C. as a uniform average. If the initial temperature of the disc is approximately 50° C., the final temperature of the disc would be 650° C. In case of a double disc, the diameter should be between 550 and 700 mm, preferably 610 mm in diameter, and the thickness would vary between 20 and 30 mm, preferably 25 mm, and lastly, the final temperature of the disc would be approximately 260° C. This temperature corresponds to 60% less than in a simple disc type brake.

Since disc heating during braking is not uniform due to the formation of rings of higher temperature around the interface at the pad edge in contact with the disc surface, maximum point instantaneous temperatures on the disc surface could be hundreds of degrees higher than those mentioned above. This makes the single disc unviable for the referenced braking.

The diameter of a single disc having the same thickness and heating properties as the double disc for this braking would have a diameter in excess of 800 mm, consequently interfering with other mechanical elements in the nacelle, which likewise makes its use unfeasible. In addition, this single disc would require calipers having a longer depth to fit pads that are wider, longer and structurally reinforced with sections of thicker material to support elevated loads due to larger flexural moments in the unions between the two halves, which would be a substantial increase in weight and cost, likewise making installation and maintenance tasks difficult.

The invention claimed is:

1. A wind turbine mechanical brake that comprises a disc element that rotates with the transmission shaft and braking calipers that rub against the disc element when activated, wherein said wind turbine mechanical brake is located on a high-speed shaft and wherein the disc element is formed by at least two discs, each disc having a continuous braking surface, and wherein said wind turbine mechanical brake has at least two calipers applied one on each disc, said calipers being anchored on a gearbox chassis.

2. The wind turbine mechanical brake according to claim 1, wherein the braking calipers are anchored to the gearbox chassis by fastening elements.

3. The wind turbine mechanical brake according to claim 2, wherein the braking calipers are anchored to the gearbox chassis by threaded bolts.

4. The wind turbine mechanical brake according to claim 1, wherein the discs have dimensions of between 20 and 30 mm in thickness, and between 550 and 700 mm in diameter.

5. The wind turbine mechanical brake according to claim 4, wherein the discs have dimensions of 25 mm in thickness and 610 mm in diameter.

6. The wind turbine mechanical brake according to claim 1, wherein the at least two discs and braking calipers are located after the gearbox, as close to it and as far from a generator as possible.

* * * * *